April 6, 1943.                A. S. CLARKE                2,316,048
                                FISH LURE
                           Filed Oct. 22, 1941
Fig. 1.            Fig. 2.
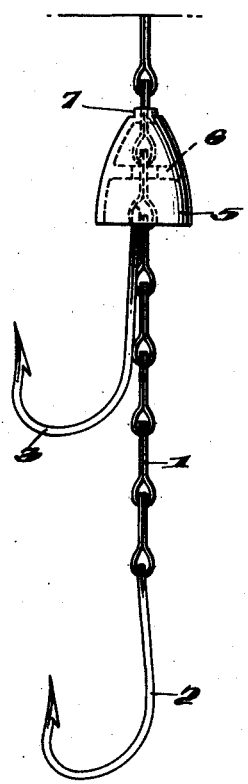
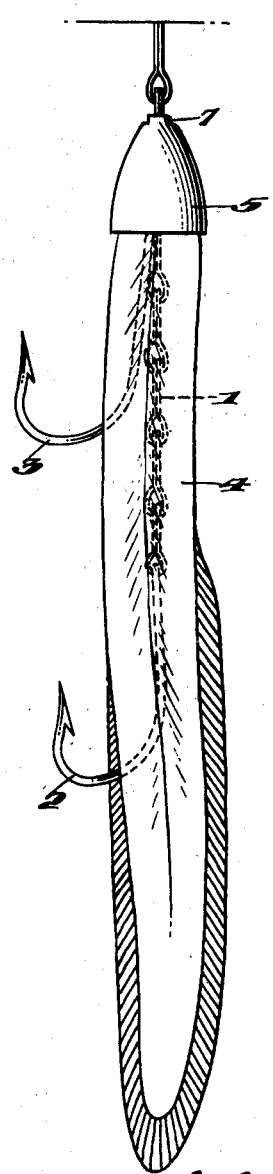
Fig. 3.
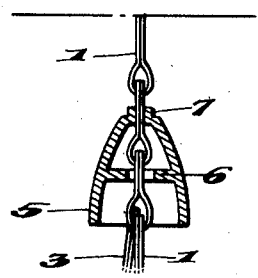
Inventor
Arthur S. Clarke
By J. Austin Swecker
Attorney Patented Apr. 6, 1943

2,316,048

UNITED STATES PATENT OFFICE 2,316,048

FISH LURE

Arthur S. Clarke, Jamestown, R. I.

Application October 22, 1941, Serial No. 416,107

8 Claims. (Cl. 43—40)

This invention relates to an improvement in fish lures, particularly of the character resembling a live eel.

The object of the invention is to improve the construction of the lure, so that it has the appearance of a live eel; when drawn through the water on the end of a fisherman's line, it has the motion of a live eel swimming; and when taken by a fish, it will not be severed by the bite of the fish.

This object is accomplished by the provision of a flexible device, such as a chain, that is threaded through the body of an eel and has the hooks attached thereto, so as to permit freedom of movement of the eel through the water simulating the motion of a live eel swimming, and yet the flexible device or chain so securely supports the hook or hooks that it cannot be severed by the bite of the fish. A weight can be applied to the flexible device in a position to simulate the head of the eel, and thus provide the desirable casting weight for the lure.

A preferred embodiment of the invention is illustrated in the accompanying drawing in which:

Fig. 1 is a side elevation of the lure without the eel bait applied thereto;

Fig. 2 is a similar view with the eel bait thereon; and

Fig. 3 is a detail longitudinal section through the weight and adjacent portion of the flexible device.

The lure is constructed of an elongated flexible device, preferably a metallic chain designated generally by the numeral 1, which is adapted to be attached to the end of a fish line for support thereby. The chain 1 has one or more hooks carried thereby as desired, one of which is designated 2, attached to the end of the chain 1, and a second hook is shown at 3 attached thereto intermediate the ends of the chain. These hooks are shown as attached by passing the eyes thereof through the links of the chain.

The bait of the lure is shown at 4, preferably comprising a natural eel through which the chain may be threaded lengthwise to dispose the hooks at one side of the eel, as shown in Fig. 2.

At one end of the eel 4 is a casting weight, shown generally at 5, and preferably constructed of conical shape and formed of lead, so as to give the desired casting weight. The weight 5 is formed with a perforated partition 6, extending transversely thereof intermediate the ends of the weight, the size of the opening substantially corresponding with the width of the chain links, so as to center the weight thereon. The chain 1 passes through the forward end of the weight at the apex of the cone, and the latter is flattened out at 7 to secure the same directly on the link passing therethrough. If desired, the metal of the weight 5 may be pressed into the opening in the link as a more secure fastening of the weight thereto.

In preparing the lure, the head of the eel should be cut off just back of the fins. The chain 1 can be threaded through the eel with a large needle, after which the eel may be secured thereto as by sewing through a link of the chain at the head, so that the chain extends through the eel from the forward end thereof to the hooks. The weight 5 is applied to the chain substantially at the forward end of the eel, so as to represent the head thereof and to provide the desired casting weight. The conical shape of the weight not only guides it through the water, but it also allows this weight to be pinched over the forward end of the eel to hold the parts in properly assembled relation.

The eel is thus secured in place on the chain and assembled in life-like fashion, while the flexibility of the chain allows the eel to be drawn through the water on the end of the fishing line, simulating the motion of a live eel swimming. A chain is used so that the bite of the fish cannot sever the bait and get lost therefrom.

Such a lure has been used very advantageously for the catching of striped bass, although it is obvious that it may be used also for other types of fish.

I claim:

1. A fish lure comprising a flexible device having one or more hooks attached thereto and adapted to receive an eel lengthwise over said flexible device, and a substantially conical weight secured to said flexible device in a position thereon to simulate the head of the eel.

2. A fish lure comprising a flexible chain having a hook secured thereto at one end thereof, a second hook secured to the chain intermediate the length thereof, said chain being adapted to receive a bait thereon, and a substantially conical weight sleeved over said chain and secured thereto.

3. A fish lure comprising a flexible chain having a hook secured thereto at one end thereof, a second hook secured to the chain intermediate the length thereof, said chain being adapted to receive a bait thereon, a substantially conical weight sleeved over said chain and secured thereto, said weight being hollow with a transverse partition intermediate the length thereof, said partition having an orifice therein receiving the chain and of a size substantially fitting the width of the chain to center the weight thereon, and means for securing the apex of the conical weight on the chain.

4. A fish line comprising a flexible chain having a hook thereon, an eel telescoped over said chain and forming a bait for the lure, and an approximately conical weight attached to the chain at the forward end of the eel simulating the head thereof.

5. A fish lure comprising a flexible device having one or more hooks attached thereto and adapted to receive an eel lengthwise over said flexible device, and a substantially conical weight having an apex end portion secured to said flexible device and in a position thereon to simulate the head of the eel, the opposite end portion of said weight being hollow with flaring sides spaced from said flexible device to receive therebetween an end of said eel.

6. A fish lure comprising a flexible chain having a hook thereon, an eel telescoped over said chain and forming a bait for the lure, and an approximately conical weight attached to the chain at the forward end of the eel simulating the head thereof, said weight having a hollow end portion embracing the adjacent portion of the eel to hold the same in assembled relation.

7. A fish lure comprising a flexible device having a hook secured thereto at one end thereof, a second hook secured to the flexible device intermediate the length thereof, said flexible device being adapted to receive a bait thereon, and a substantially conical weight sleeved over said flexible device and secured thereto on the opposite side of the second hook from the first-mentioned hook.

8. A fish lure comprising a flexible device having a hook secured thereto at one end thereof, a second hook secured to the flexible device intermediate the length thereof, said flexible device being adapted to receive a bait thereon, and a substantially conical weight sleeved over said flexible device and secured thereto on the opposite side of the second hook from the first-mentioned hook, said weight having the apex end portion thereof clamped on the flexible device and the opposite end portion therof hollow and recessed to hold the bait in place on the flexible device.

ARTHUR S. CLARKE.